US007752328B2

(12) United States Patent
Mortimore, Jr. et al.

(10) Patent No.: US 7,752,328 B2
(45) Date of Patent: Jul. 6, 2010

(54) SYSTEM AND METHOD FOR VIEW OF TRANSACTIONS AND EVENTS WITH DYNAMIC UPDATES

(75) Inventors: William Charles Mortimore, Jr., San Francisco, CA (US); Matthew Mihic, San Francisco, CA (US)

(73) Assignee: Rearden Commerce, Inc., Foster City, CA (US)

( * ) Notice: Subject to any disclaimer, the term of this patent is extended or adjusted under 35 U.S.C. 154(b) by 403 days.

(21) Appl. No.: 11/690,028

(22) Filed: Mar. 22, 2007

(65) Prior Publication Data

US 2008/0092160 A1 Apr. 17, 2008

Related U.S. Application Data

(63) Continuation-in-part of application No. 11/549,950, filed on Oct. 16, 2006, and a continuation-in-part of application No. 11/549,961, filed on Oct. 16, 2006.

(51) Int. Cl.
*G06F 13/00* (2006.01)
(52) U.S. Cl. ...................................... 709/231
(58) Field of Classification Search ................. 709/231, 709/230, 217–219
See application file for complete search history.

(56) References Cited

U.S. PATENT DOCUMENTS

| | | | |
|---|---|---|---|
| 5,608,900 A | 3/1997 | Dockter et al. | |
| 5,963,913 A | 10/1999 | Henneuse et al. | |
| 5,963,965 A | 10/1999 | Vogel | |
| 6,041,311 A | 3/2000 | Chislenko et al. | |
| 6,199,099 B1 * | 3/2001 | Gershman et al. | 709/203 |
| 6,263,340 B1 | 7/2001 | Green | |
| 6,449,632 B1 | 9/2002 | David et al. | |
| 7,035,825 B1 | 4/2006 | Sturtevant et al. | |
| 7,293,019 B2 * | 11/2007 | Dumais et al. | 707/5 |
| 2002/0059339 A1 | 5/2002 | McCormick et al. | |
| 2002/0116541 A1 | 8/2002 | Parker et al. | |
| 2005/0198056 A1* | 9/2005 | Dumais et al. | 707/101 |
| 2006/0167704 A1* | 7/2006 | Nicholls et al. | 705/1 |
| 2006/0173985 A1 | 8/2006 | Moore | |
| 2006/0224969 A1 | 10/2006 | Marston | |
| 2007/0233736 A1 | 10/2007 | Xiong et al. | |
| 2008/0005134 A1 | 1/2008 | Welch | |
| 2008/0005148 A1 | 1/2008 | Welch | |
| 2008/0040288 A1 | 2/2008 | Mortimore | |
| 2008/0091828 A1 | 4/2008 | Mortimore | |
| 2008/0092160 A1 | 4/2008 | Mortimore | |

OTHER PUBLICATIONS

Avoy, Kevin et al., U.S. Appl. No. 11/323,135, entitled "Method and System for Dynamic Event Adjustment", filed Dec. 29, 2005.

(Continued)

*Primary Examiner*—Kenneth R Coulter
(74) *Attorney, Agent, or Firm*—Greenberg Traurig, LLP

(57) ABSTRACT

In one embodiment, a method that can be performed on a system, is provided for view of transactions with dynamic updates. In one embodiment, the method comprises a portal assigned to a user, receiving one or more syndication feeds; the portal receiving one or more events, the events being non-syndication feeds; a syndication engine filtering the events and syndication feeds based on predetermined set of rules; and the syndication engine presenting at the portal to the user, the events and syndication feeds as syndication feeds in a syndication format.

16 Claims, 7 Drawing Sheets

OTHER PUBLICATIONS

Transaction History of U.S. Appl. No. 11/323,135, filed Dec. 29, 2005, entitled "method and System for Dynamic Event Adjustment."

Transaction History of U.S. Appl. No. 11/478,799, filed Jun. 30, 2006, entitled "Automated Knowledge Base of Feed Tags."

Transaction History of U.S. Appl. No. 11/479,434, filed Jun. 30, 2006, entitled "Derivation of Relationships Between Data Sets Using Structured Tags or Schemes."

Transaction History of U.S. Appl. No. 11/484,134, filed Jul. 10, 2006, entitled "Method and System for Using RSS-Type Feeds in an E-Commerce Environment."

Transaction History of U.S. Appl. No. 11/549,950, filed Oct. 16, 2006, entitled "Method and System for Fine and Course-Grained Authorization of Personal Feed Contents."

Transaction History of U.S. Appl. No. 11/690,028, filed Mar. 22, 2007, entitled "System and Method for View of Transactions and Events with Dynamic Updates."

* cited by examiner

SYSTEM AND METHOD FOR VIEW OF TRANSACTIONS AND EVENTS WITH DYNAMIC UPDATES

CROSS-REFERENCE TO RELATED APPLICATIONS

The present application is a continuation-in-part of U.S. patent application Ser. No. 11/549,950, filed Oct. 16, 2006 entitled "Method and System for Fine and Coarse-Grained Authorization of Personal Feed Contents," and a continuation-in-part of U.S. patent application Ser. No. 11/549,961, filed Oct. 16, 2006 entitled "Method and System for Dynamic Social Networking Based on Similar Travel Itineraries." In addition, the present application is related to U.S. patent application Ser. No. 11/112,376, filed Apr. 21, 2005 entitled, "Aggregate Collection Of Travel Data," U.S. patent application Ser. No. 11/178,007, filed Jul. 31, 2005 entitled "System for Travel Services Resource," U.S. patent application Ser. No. 11/240,739, filed Sep. 30, 2005 entitled "Method And System For Capturing And Calculating Complex Consumer Ratings Of Goods And Services," and U.S. patent application Ser. No. 11/240,740, filed Sep. 30, 2005 entitled "Method And System For Testing Of Policies To Determine Cost Savings," all of which are incorporated herein by reference.

BACKGROUND OF THE INVENTION

People often make travel bookings according to a predetermined set of rules, or according to their accustomed travel arrangements. However, certain types of bookings may often result in costly changes at the last minute. It may be that booking different types travel arrangements, for example, in a different travel class with no change penalty, may be a wiser choice for certain bookings, such as, for example, bookings for travel and accommodations for a convention or for a customer meeting that may often require last-minute changes.

What is clearly needed is a system, method and apparatus for tracking booking behavior patterns of travelers, and, based on historical aggregate data and internal and external events, for suggesting better booking methods for initial bookings, resulting in a lower average over-all cost.

Often people travel to the same destination or use the same accommodations repeatedly, and they may notice other people who also make the same trip or use the same accommodations repeatedly. However, there is no good way for a person to meet these other travelers and the person is also concerned about doing so without previously knowing something about the person or persons he would like to meet.

What is clearly needed is a system, method, and apparatus that allows unacquainted travelers who travel the same routes or use the same facilities or services, etc. to enter into a social network in a controlled manner.

Travel resources associated with certain events tend to become very scarce as the event approaches. For example, flights and hotel rooms to a large industry exposition tend to be booked weeks or even months ahead of time. In cases of annual events, these resources may be booked even years ahead of time.

What is clearly needed is a system and method that takes into consideration planning for such events and accordingly blocks and books reservations for customers based on their past travel patterns. In some cases the system could even go beyond that and book rooms for speculative "banking" of travel assets such as hotel rooms and flight capacity.

Users may be connected to one or more of many different transactions systems. Some of these system may send them email, while others may send them other kinds of special notifications, SMSes, etc.

What is clearly needed is a system and method to collect and combine all of a user's incoming information and have one standardized means of information transmission to the user, using an RSS-style live feed.

SUMMARY

In one embodiment, a method that can be performed on a system, is provided for view of transactions with dynamic updates. In one embodiment, the method comprises a portal assigned to a user, receiving one or more syndication feeds; the portal receiving one or more events, the events being non-syndication feeds; a syndication engine filtering the events and syndication feeds based on predetermined set of rules; and the syndication engine presenting at the portal to the user, the events and syndication feeds as syndication feeds in a syndication format.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
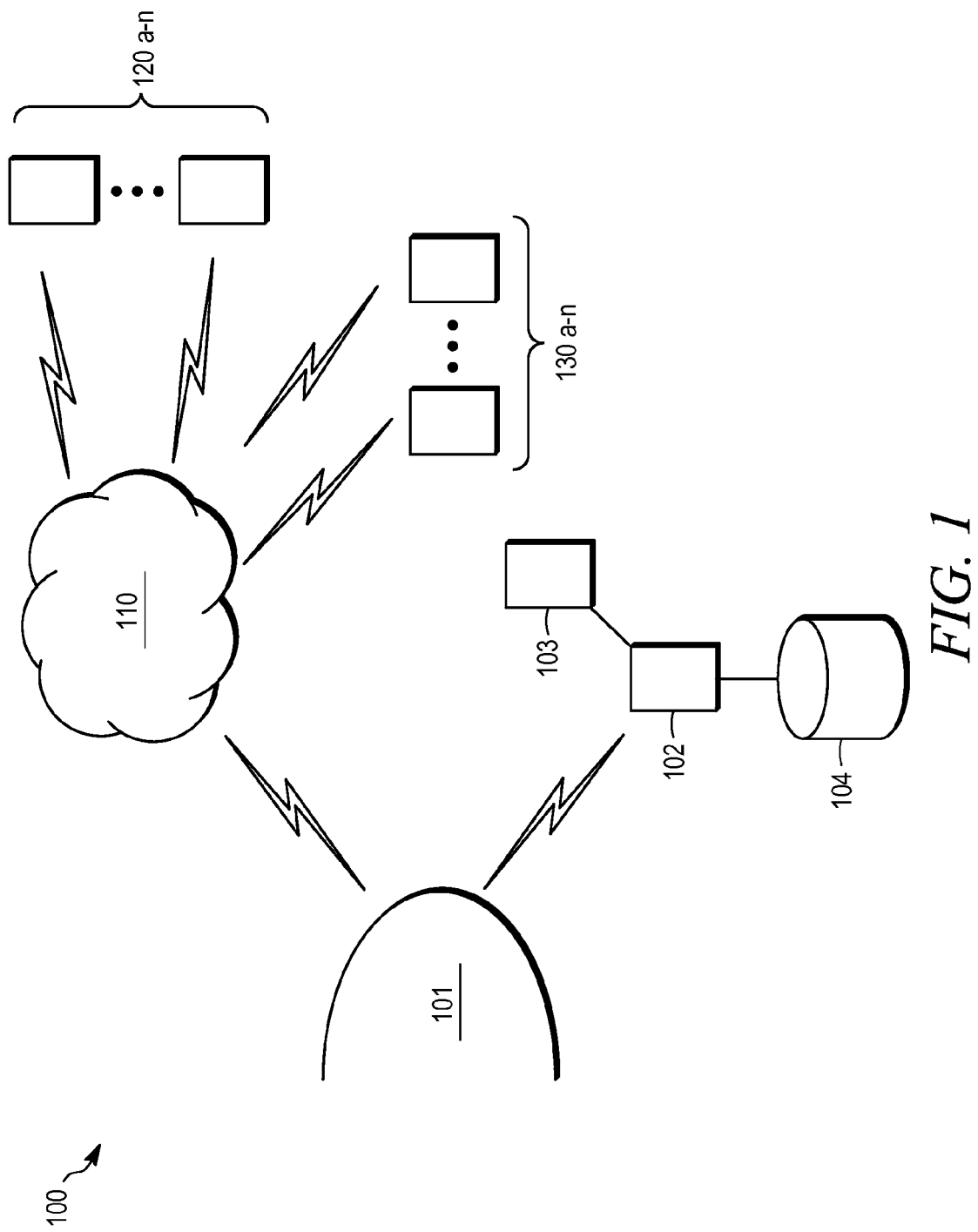
FIG. 1 shows an overview of a system according to one embodiment.

FIG. 1 shows an overview of a system 100 according to the present invention. An electronic services system 101 has a server 102 that hosts a software instance 103 and has access to a data repository or database 104. It is clear that this simplified depiction shows only elements of interest pertaining to the present invention, and that all these elements may be part of a much larger system. Also shown is a connection of electronic services system 101 to the Internet 110, to which users 130

*a-n* and vendors 120 *a-n* are also connected. It is clear that in some cases the users and/or vendors may be connected to services system 101 directly, or through a private network or VPN or some other type of network connection without departing from the spirit of the invention.

Figure 2:
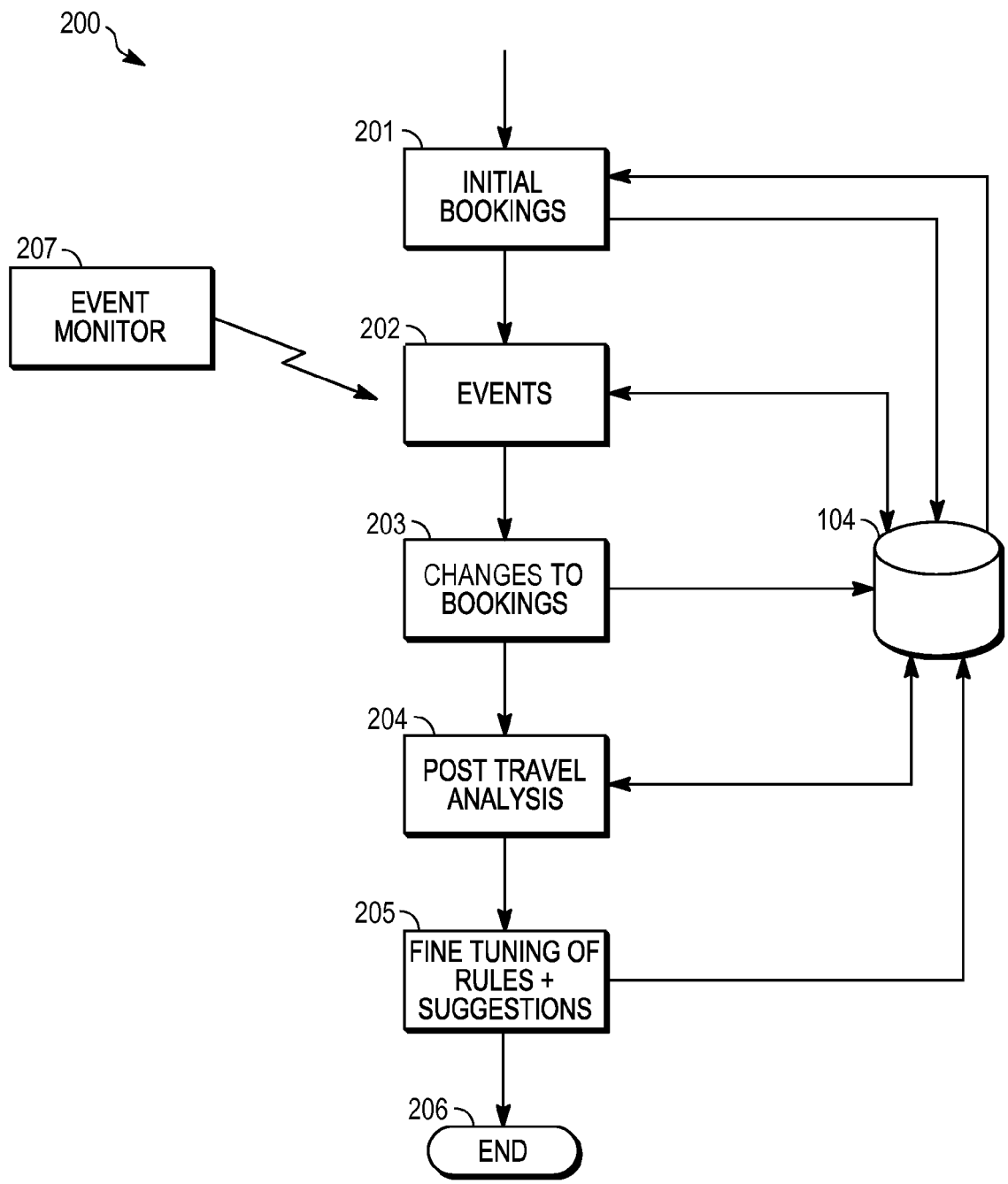
FIG. 2 shows an exemplary process for implementation of the system according to one embodiment.

FIG. 2 shows an exemplary process 200 for implementation of the system according to one embodiment of the present invention. In step 201 a user makes an initial booking, in some cases based on recommendations by the system, which recommendations are stored in database 104. It will be discussed later how these recommendations are generated, but in essence they are based on the rules that apply for this individual user, with some variations as discussed below. In step 202, an event monitor 207 monitors events relevant to the traveler's plans, including events in the traveler's own agenda and schedules within his company, external events along his travel route and at his accommodations (in all the cities and countries that are included in the travel route), and also events at partner companies that he is visiting. Based on those events, in step 203, the user may need to make changes in his bookings. The correlation between the changes and the monitored events are stored in database 104, as well as the changes themselves.

After the traveler returns from his trip, in step 204, the system does a post-travel analysis to determine whether some of the penalties and fees invoked by travel changes could have been avoided or lowered had different types of bookings been made. These analysis results are also stored in database 104. In step 205, the system makes a fine-tuning of rules and suggestions, based on the historic aggregate of relevant travels of both this user and other users who followed the same route, and in step 206, the process ends. For example, a large event at a target location may have led to cancellations or changes in hotel reservations or overbooking of flights, and therefore to unacceptable delays or problems in users' travel plans. Thus the system may determine that the traveler should have initially purchased an unrestricted ticket, allowing him to avoid change penalties, etc.

In some cases, a novel aspect of the software system includes attributes for a trip that the electronic services system would look at for both new and historical trips. Some example attributes of a trip could include the following: reason for trip (e.g., sales call, maintenance call, industry conference, internal meeting, etc.), specific parties involved in the trip (e.g., customer A, internal colleague B, industry conference C, etc.), specific location (e.g., a given city, convention center, or a property of a city such as being a European city or an Asian city), timing (e.g., time of year, the fact that the trip is on a Monday or Friday, proximity to a major holiday, etc.), proximity to other activities on a user's calendar (e.g., do other meetings in different cities tightly adjacent introduce additional travel change risk, do tentative, conflicting meetings on the user's calendar make a change more likely), user-defined priority of the event (e.g., the user could state that this is a Tier 1 customer or a Tier 2 customer, which could inform whether the trip is likely to change), and other attributes of the trip, both defined by the user and derived from the attributes of the proposed and past trips.

Additionally, in yet other cases, the system could offer a display of the same booking with different rate/restriction combinations. For example, a hotel room may be available at a given hotel with three options. Option A might have a large penalty for change and a pre-payment requirement, option B might have only a penalty if not cancelled 24 hours ahead, but a higher per night rate, and option C might have a slightly higher rate, but include amenities such as parking, breakfast, and Internet access. In these cases, a novel part of the system would be a display that shows a specific hotel with multiple booking options all in a tightly integrated display.

Dynamic Social Networking Based on Similar Travel Itineraries

Figure 3:
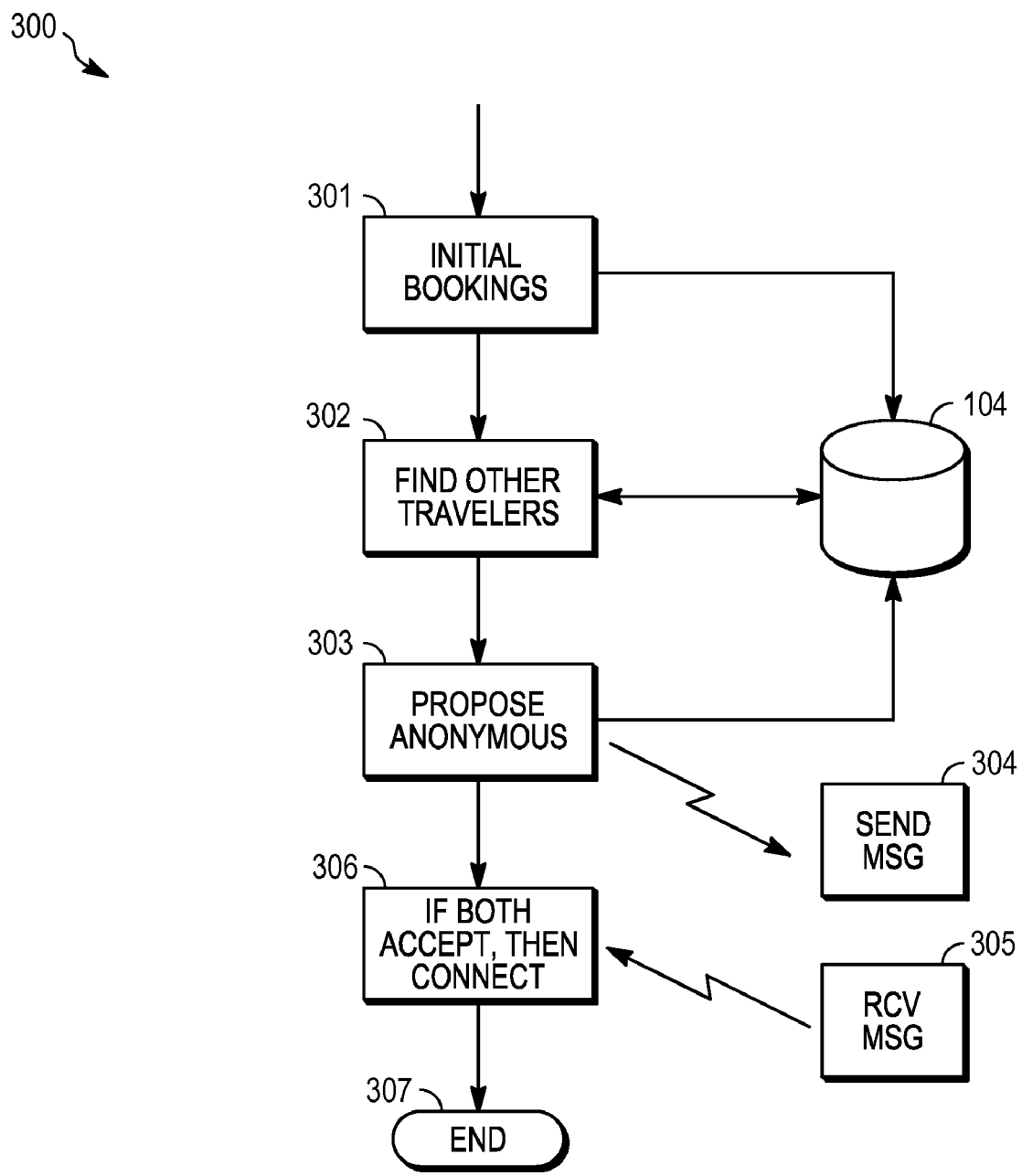
FIG. 3 shows an exemplary process for implementation of the system according to one embodiment of the present invention.

FIG. 3 shows an exemplary process 300 for implementation of the system according to one embodiment of the present invention. In step 301, the system makes a travel booking and stores the booking information in database 104. In step 302, the system searches database 104 to find other travelers who have the same bookings for some or all of the itinerary. In some cases, the system may also search other available data from other sources. In step 303, the system asks the original traveler if he wants to send out an anonymous proposal to meet via function 304 to another traveler to meet at a mutual itinerary point. Unlike "chance meetings," meetings could be arranged between total strangers, of unrelated companies, if so desired.

In some cases, as part of the anonymous proposal program, for example, the company may have certain rules about their employees meeting with employees from certain other companies (such as competitors or adversaries). Thus a traveler could specify that he does not want to meet other travelers from company XYZ, or he could submit a list of individuals he does not wish to meet, for whatever reason. Any response is received via function 305. Then in step 306, if both travelers accept the proposal, they may make a connection. The process ends at step 307. In some cases, in case of a rejection, the reason for the rejection would not be disclosed, or even the fact of a rejection. Rather, the system would respond with a laconic, non-disclosing "no match found" type of message.

In one embodiment, a user identifies who the user wants to meet via a "buddy list" concept similar to a network a user has in an IM system. In the embodiment, the system also allows the end user to put in attributes describing the types of people they would be interested in meeting. Some example attributes could include companies in an explicit list, companies with which the user's company has a relationship (e.g. customers of my company, suppliers to my company). Other example attributes could include the position or role of the person (a user could be interested in other engineers, other marketing people, etc.).

In one embodiment, the system also allows the user to define when they want to meet. Some examples of more instructions on when include time ranges such as "evenings." In one embodiment, the timing is dependent on other information fed into the system via a calendar.

For example the user can identify any time that their calendar shows as free is potentially open to a meeting. The user could also define an explicit prioritization of times. For example, the user could state that their top priority time would be during the lunch hour, followed by a second priority being during the dinner hour, followed by other times that are free as a third priority.

In one embodiment, the system could also allow the user to input preferences on the type of activity that they would like to invite others to join. For example, they might input that they would prefer to share a meal or attend an event with others. Within the category of events, they would rank the types of events they would like to find people to invite. For example, a user might rank Yankee games as their top priority, baseball games in general as their second priority, and sporting events as their third priority.

One embodiment includes the ability to book the same or similar arrangements as others, including making alternative recommendations and perform the booking if the user request (e.g., car rentals). In one embodiment, if the user learns that a colleague is going to the same location (e.g. headquarters office) then it may be more cost effective to cancel your car booking and ride with the other person.

Predictive Booking of Reservations Based on Historical Aggregation and Events

Figure 4:
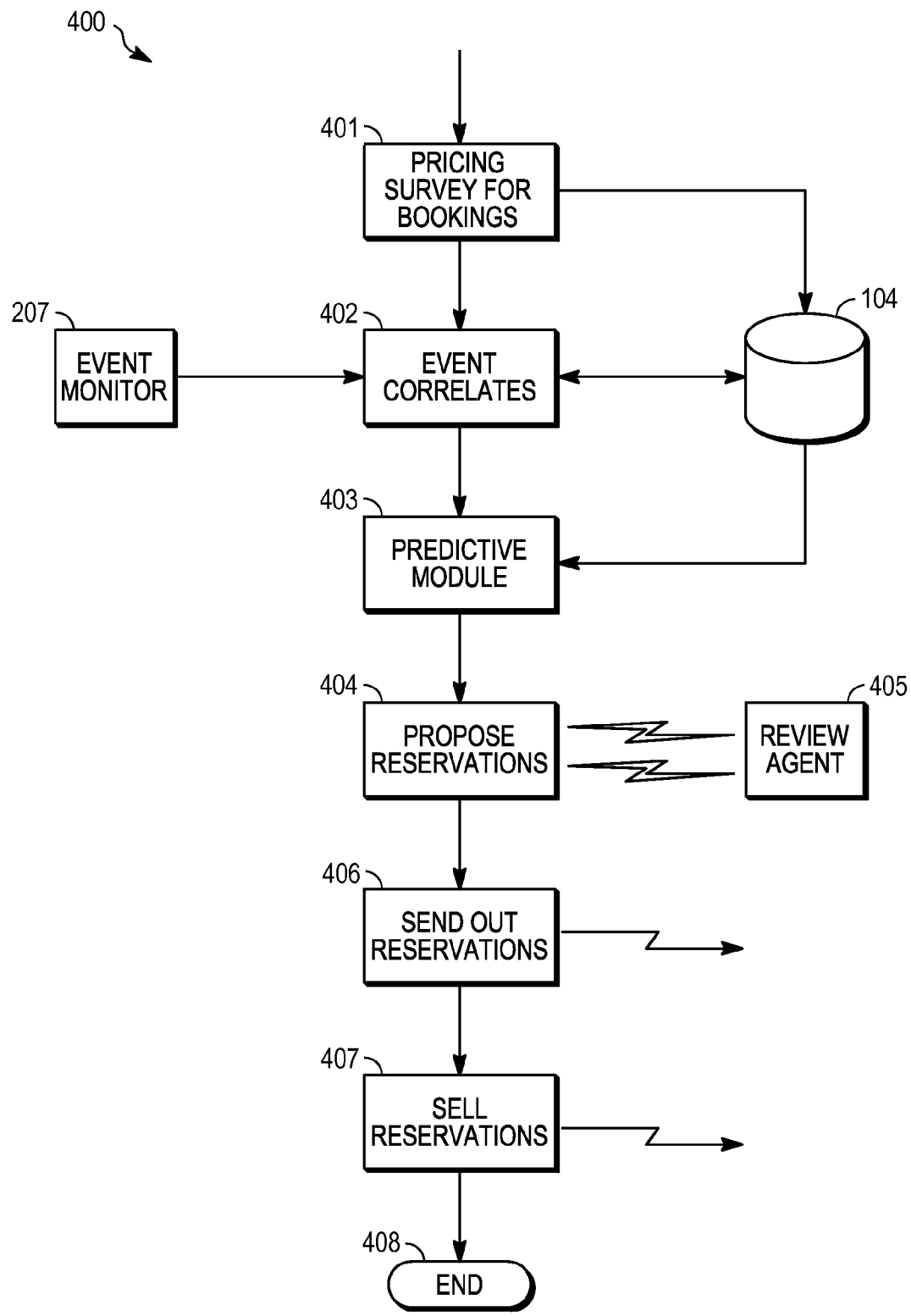
FIG. 4 shows an exemplary process for implementation of the system according to one embodiment of the present invention.

FIG. 4 shows an exemplary process 400 for implementation of the system according to one embodiment of the present invention. In step 401 the system makes pricing surveys travelers' bookings that are often repeated. In step 402 the system correlates events to those results of the pricing surveys and to pricing changes over various time periods, for example, daily, weekly, monthly, or even yearly repetitions, using event monitor 207. Events could include such things are fare changes, fare wars, related events such as trade shows in the area, family events of travelers, and other internal and external events. The system can also use the context of travelers' bookings to predict shortages and reserve for banking travel "futures" such as flights and hotel rooms.

The event correlations in step 402 are then fed into a predictive module in step 403, which, based on the reservations already executed for an event and the typical relationship of the current reservations to the total reservation expectations, in step 404 proposes an additional block of reservations to secure sufficient capacity for expected customer demand. These proposed reservations may, optionally, be reviewed by a review agent 405. The system then books the reservations in step 406, and in step 407 the system sells those reservations to customers, based on past behavior and expectations. The process then ends at step 408.

In one embodiment, the ability to accurately predict when a resource will sell out is visually displayed to a shopper/user, to re-enforce the need to purchase immediately. By indicating when a resource will go scarce, the system would improve look to book ratios.

View of Transactions and Events with Dynamic Updates

Figure 5:
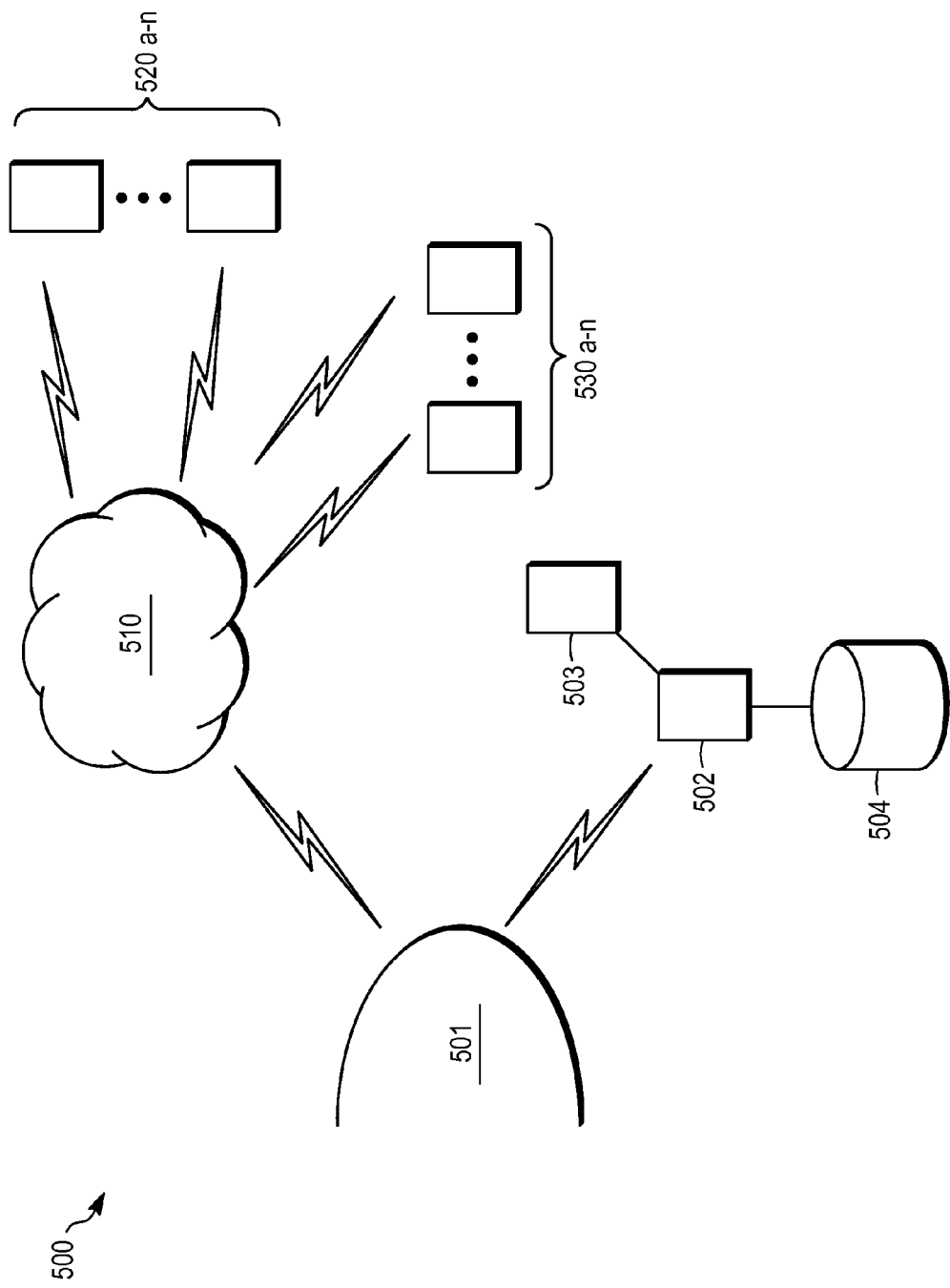
FIG. 5 shows an overview of an exemplary simplified system according to one or more embodiments.

FIG. 5 shows an overview of an exemplary simplified system 500 according to one or more embodiments of the present invention. An electronic services system 501 has a server 502 that hosts one or more software instances 503 and has access to a data repository or database 504. It is clear that this simplified depiction shows only elements of interest pertaining to the present invention, and that all these elements may be part of a much larger system. Also shown is a connection of electronic services system 501 to the Internet 510, to which users 530 a-n and vendors 520 a-n are also connected. It is clear that in some cases the users and/or vendors may be connected to services system 501 directly, or through a private network or VPN or some other type of network connection without departing from the spirit of the invention.

Figure 6:
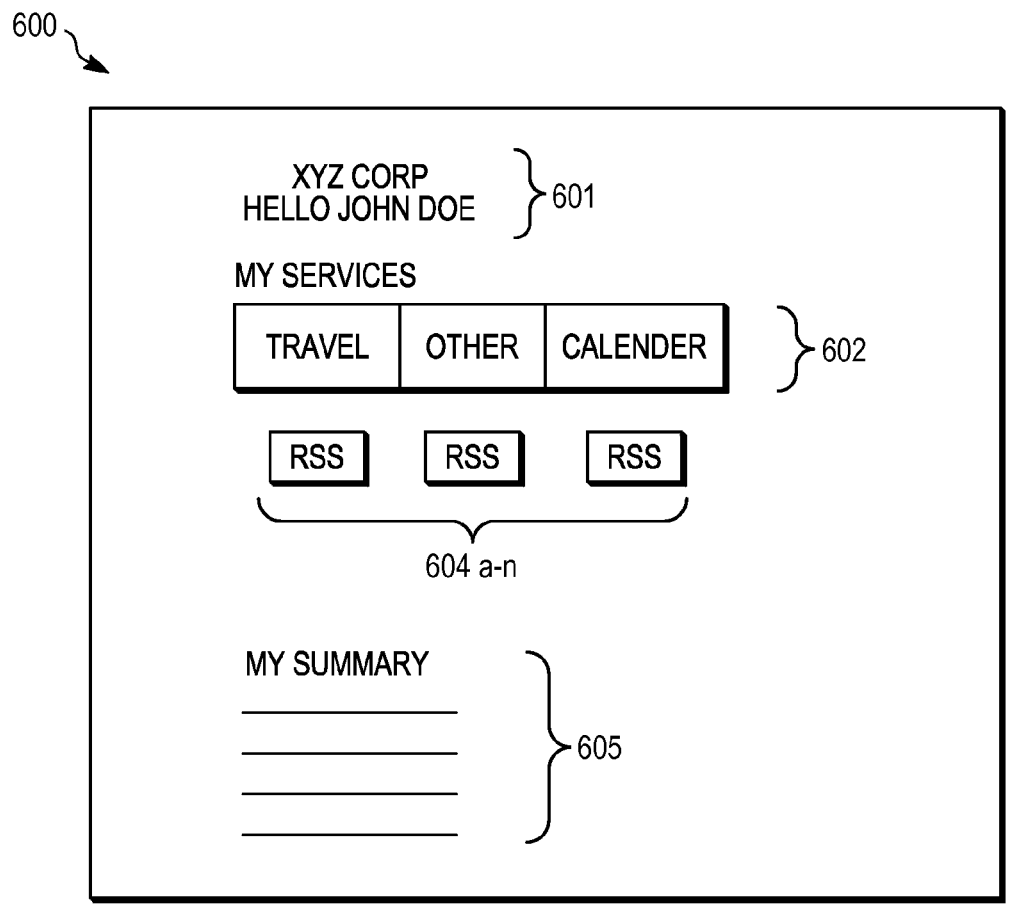
FIG. 6 shows an exemplary screen shot wherein the user is looking at a portal page, in accordance with one embodiment.

FIG. 6 shows an exemplary screen shot wherein the user is looking at his services portal home page 600. The header 601 typically identifies the company and the user ("XYZ Corp" and "John Doe"). Under functional buttons 602 describing sections such as Travel, Calendar, and Other are buttons for customized RSS feeds 604 a-n that allow the user to subscribe to one of more segments of each of those services-related RSS feeds. There could also be an additional button (not shown) that allows the user to subscribe to all the RSS feeds. In addition, inside each different section the system may offer to supply the user with one or more specific filters, according to the type of RSS feed(s) that he wants. Section 605 is an informational block containing, for example, text of an overview of the user's current services and activities. Instead of an RSS feed, it is clear that other types of feeds, such as Atom or other, more suitable current protocols may be used. In particular, these RSS feeds are personalized to the user's requests and transactions. For example, the Travel feed may include a V-calendar of events or V-cards for people he has met in his travels as attachments to the RSS feed. Thus the user could, by clicking on the attachment link, view the data or to save it into, for example, his calendar application on his machine.

Figure 7:
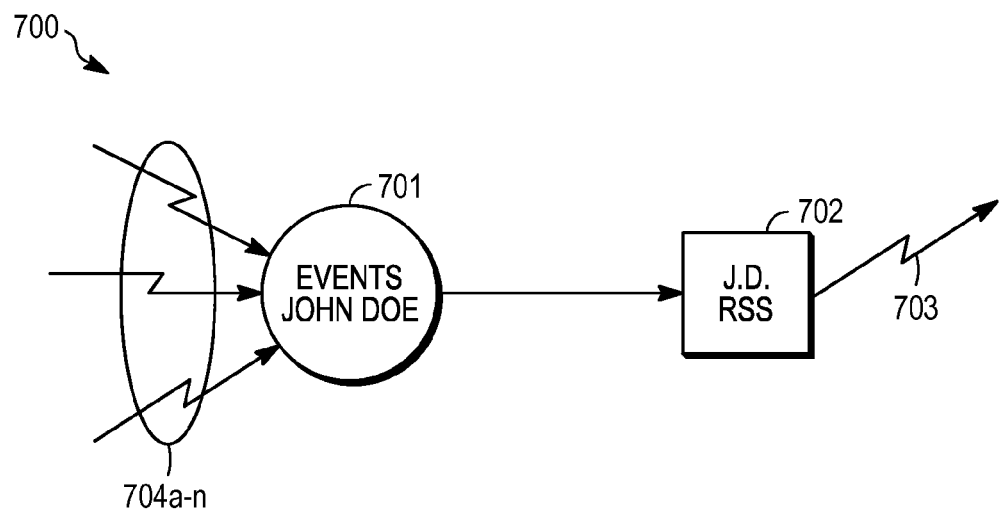
FIG. 7 shows an exemplary overview of a data collection architecture, in accordance with one embodiment.

FIG. 7 shows an exemplary overview of a data collection architecture 700. Node 701 collects all the events pertaining to the user John Doe. Streams of information may come from many sources 704 a-n, such as, for example, his travel calendar, his work calendar, other RSS and Atom feeds, and emails containing news of his travels and other services he has booked. This information is then presented by an RSS engine 702 for the user (J.D.) as RSS feed 703. This approach of the current invention is different from the previous case, described in copending patent application Ser. No. 11/549, 950, filed Oct. 16, 2006 entitled "Method and System For Fine- and Coarse-Grained Authorization of Personal Feed Contents," in that it includes data such as booking transactions, etc., which are not normally supplied as RSS feeds. Thus, rather than including only filtered RSS feeds or generic mails, the approach of the current invention could also include the user's own personal data, for example, from his calendar or other data of personal interest to that user.

Figure 8:
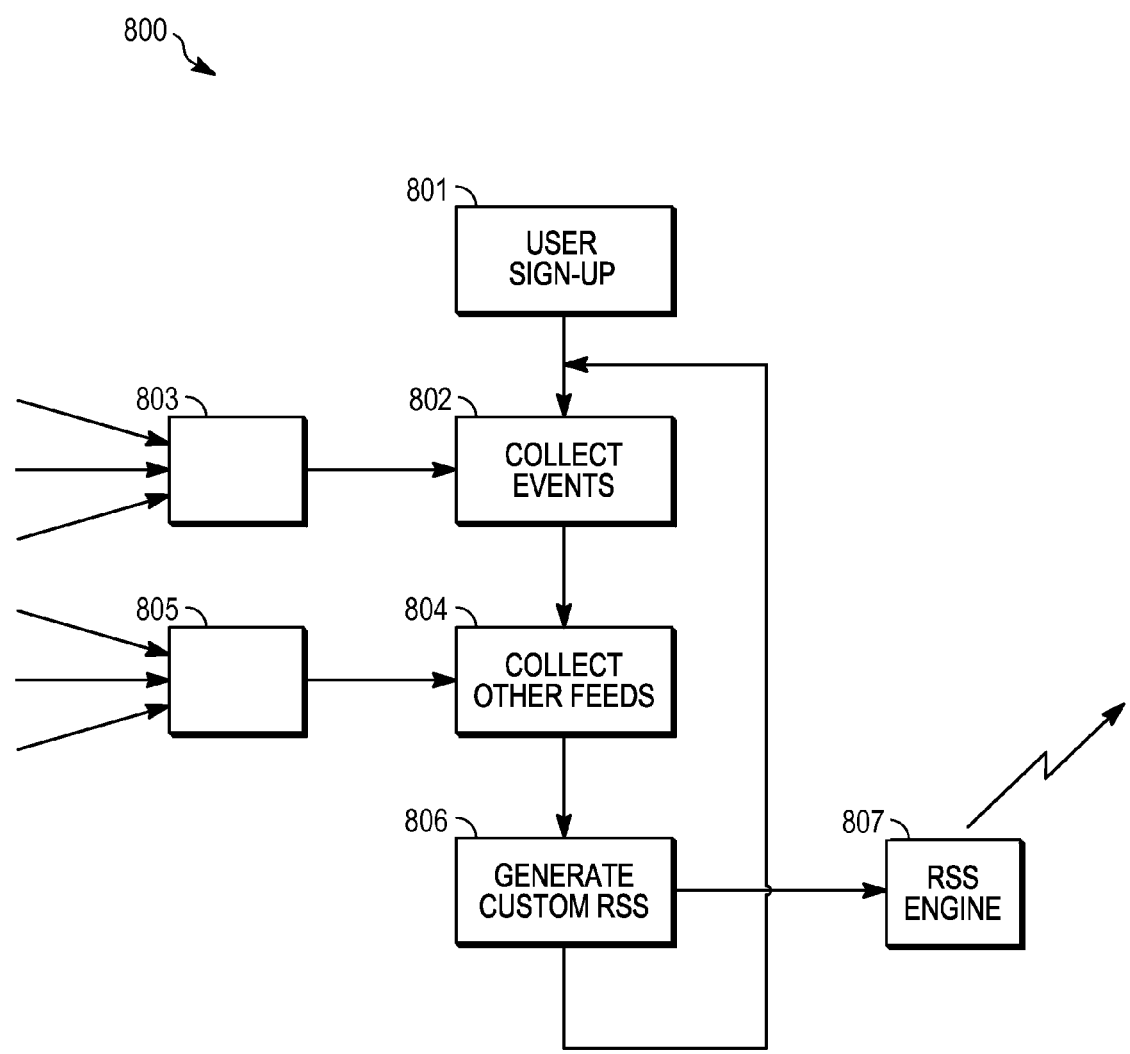
FIG. 8 shows in another view an exemplary process for implementation of the system according to one embodiment of the present invention.

FIG. 8 shows in another view an exemplary process 800 for implementation of the system according to one embodiment of the present invention. In step 801 the user signs up by clicking one of the RSS feed buttons 604a-n on the services system home page 600. Once the user has signed up, in step 802 an RSS engine 803 collects the personal events of the user. Then in step 804, an RSS engine 805, which could be one of the types described in copending patent application Ser. No. 11/549,950, filed on Oct. 16, 2006 entitled "Method and System For Fine- and Coarse-Grained Authorization of Personal Feed Contents," but could also collect other information of one or more other types, collects external event feeds and internal events, transactions, and other information from various sources and filters all those collected events according to the corporate and personal rules of the system for that user. Then in step 806, based on the user's rules established when he signs up for the service, a specific RSS stream designed for this user would be sent out by RSS engine 807. The process continues to loop through its steps as long as the user is signed up.

It is clear that many modifications and variations of this embodiment may be made by one skilled in the art without departing from the spirit of the novel art of this disclosure.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's).

What is claimed is:

1. A computer implemented method comprising:
a portal assigned to a user, receiving, via a computing device, one or more syndication feeds;
the portal receiving, via the computing device, one or more events, the events being non-syndication feeds and including internal events associated with the user selected from the group consisting of calendar events of the user and electronic communications of the user, wherein the internal events come from a travel calendar of the user, a work calendar of the user, and emails regarding services booked by the user;
a syndication engine filtering, via the computing device, the events and syndication feeds based on a predetermined set of rules of an employer of the user; and
the syndication engine presenting, via the computing device, at the portal to the user, the events and syndication feeds as syndication feeds in a syndication format.

2. The method of claim 1, wherein the syndication feeds are live feeds.

3. The method of claim 2, wherein the syndication feeds comprise one of Really Simple Syndication feeds (RSS) and Atom feeds.

4. The method of claim 1, wherein the events comprise events external to the user.

5. The method of claim 1, wherein the predetermined set of rules comprises rules set by the user.

6. The method of claim 1, further comprising providing a plurality of buttons associated with a plurality of RSS feeds, each button associated with a particular type of content and upon selection by the user providing an associated RSS feed.

7. The method of claim 6, further comprising providing a single button that upon selection by the user allows subscription to all of the RSS feeds.

8. The method of claim 1, further comprising providing to the user a predetermined number of specific filters with which to select a type of RSS feed desired by the user.

9. A machine-readable storage medium having stored thereon a set of instructions which when executed perform a method comprising:
a portal assigned to a user, receiving one or more syndication feeds;
the portal receiving one or more events, the events being non-syndication feeds and including internal events associated with the user selected from the group consisting of calendar events of the user and electronic communications of the user, wherein the internal events come from a travel calendar of the user, a work calendar of the user, and emails regarding services booked by the user;
a syndication engine filtering the events and syndication feeds based on a predetermined set of rules of an employer of a user; and
the syndication engine presenting at the portal to the user, the events and syndication feeds as syndication feeds in a syndication format.

10. The machine-readable storage medium of claim 9, wherein the syndication feeds are live feeds.

11. The machine-readable storage medium of claim 10, wherein the syndication feeds comprise one of Really Simple Syndication feeds (RSS) and Atom feeds.

12. The machine-readable storage medium of claim 9, wherein the events comprise events external to the user.

13. The machine-readable storage medium of claim 9, wherein the predetermined set of rules comprises rules set by the user.

14. A computer system comprising:
at least one computing device including:
a portal assigned to a user, the portal to receive one or more syndication feeds, and the portal to receive one or more events, the events being non-syndication feeds and including internal events associated with the user selected from the group consisting of calendar events of the user and electronic communications of the user, wherein the internal events come from a travel calendar of the user, a work calendar of the user, and emails regarding services booked by the user; and
a syndication engine to filter the events and syndication feeds based on a predetermined set of rules of an employer of a user, and the syndication engine to present at the portal to the user, the events and syndication feeds as syndication feeds in a syndication format.

15. The system of claim 14, wherein the syndication feeds are live feeds.

16. The system of claim 15, wherein the syndication feeds comprise one of Really Simple Syndication feeds (RSS) and Atom feeds.

* * * * *